(12) United States Patent
Ingram et al.

(10) Patent No.: US 11,797,454 B2
(45) Date of Patent: Oct. 24, 2023

(54) TECHNIQUE FOR OPERATING A CACHE STORAGE TO CACHE DATA ASSOCIATED WITH MEMORY ADDRESSES

(71) Applicant: Arm Limited, Cambridge (GB)

(72) Inventors: Graeme Leslie Ingram, Melbourn (GB); Michael Andrew Campbell, Waterbeach (GB)

(73) Assignee: Arm Limited, Cambridge (GB)

( * ) Notice: Subject to any disclaimer, the term of this patent is extended or adjusted under 35 U.S.C. 154(b) by 39 days.

(21) Appl. No.: 17/532,555

(22) Filed: Nov. 22, 2021

(65) Prior Publication Data

US 2023/0161705 A1    May 25, 2023

(51) Int. Cl.
*G06F 12/08* (2016.01)
*G06F 12/0871* (2016.01)
(Continued)

(52) U.S. Cl.
CPC ...... *G06F 12/0871* (2013.01); *G06F 12/0246* (2013.01); *G06F 12/0808* (2013.01); *G06F 12/0877* (2013.01)

(58) Field of Classification Search
CPC .............. G06F 12/0871; G06F 12/0808; G06F 12/0246; G06F 12/02; G06F 12/0877
See application file for complete search history.

(56) References Cited

U.S. PATENT DOCUMENTS

2003/0101320 A1 * 5/2003 Chauvel .............. G06F 12/0888
711/E12.021
2011/0307664 A1 * 12/2011 Paver .................. G06F 12/0895
711/E12.001

(Continued)

FOREIGN PATENT DOCUMENTS

EP           1304620 A1 *  4/2003  ......... G06F 12/0888
WO   WO-2013017824 A1 *  2/2013  ........... G06F 1/3275

OTHER PUBLICATIONS

M. Oh, K. Kim, D. Choi, H.-J. Lee and E.-Y. Chung, "Per-Operation Reusability Based Allocation and Migration Policy for Hybrid Cache," in IEEE Transactions on Computers, vol. 69, No. 2, pp. 158-171, Feb. 1, 2020.*

(Continued)

*Primary Examiner* — Pierre Michel Bataille
(74) *Attorney, Agent, or Firm* — NIXON & VANDERHYE P.C.

(57) ABSTRACT

The present technique provides an apparatus and method for caching data. The apparatus has a cache storage to cache data associated with memory addresses, a first interface to receive access requests, where each access request is a request to access data at a memory address indicated by that access request, and a second interface to couple to a memory controller used to control access to memory. Further, cache control circuitry is used to control allocation of data into the cache storage in accordance with a power consumption based allocation policy that seeks to select which data is cached in the cache storage with the aim of conserving power associated with accesses to the memory via the second interface. A given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage.

22 Claims, 8 Drawing Sheets

(51) Int. Cl.
  *G06F 12/02* (2006.01)
  *G06F 12/0808* (2016.01)
  *G06F 12/0877* (2016.01)

(56) References Cited

U.S. PATENT DOCUMENTS

| | | | |
|---|---|---|---|
| 2014/0380307 A1* | 12/2014 | Zhu | G06F 9/45533 718/1 |
| 2015/0032963 A1* | 1/2015 | Punde | G06F 12/0811 711/122 |
| 2020/0264788 A1* | 8/2020 | Srinivas | G06F 3/0634 |
| 2021/0182193 A1* | 6/2021 | Na | G06F 12/0811 |

OTHER PUBLICATIONS

Xiaodong Meng, Long Zheng, Li Li and Jie Li, "PAM: An efficient power-aware multi-level cache policy to reduce energy consumption of Software Defined Network," 2015 1st International Conference on Industrial Networks and Intelligent Systems (INISCom), Tokyo, 2015, pp. 18-23.*

Hung-Chang Hsiao and Chung-Ta King, "Boosting the performance of NOW-based shared memory multiprocessors through directory hints," Proceedings 20th IEEE International Conference on Distributed Computing Systems, Taipei, Taiwan, 2000, pp. 602-609.*

K. Kelwade, S. Sahu, G. Kawade, N. Korde, S. Upadhye and M. Motghare, "Reputation based cache management policy for performance improvement," 2017 International Conference on Intelligent Sustainable Systems (ICISS), Palladam, India, 2017, pp. 582-587.*

\* cited by examiner

TECHNIQUE FOR OPERATING A CACHE STORAGE TO CACHE DATA ASSOCIATED WITH MEMORY ADDRESSES

BACKGROUND

The present invention relates to a technique for operating a cache storage to cache data associated with memory addresses.

Typically, a cache is provided to seek to improve access times to data for associated processing elements that are arranged to perform operations on that data, and thereby improve the performance of those processing elements. Whilst some caches may be directly associated with a particular processing element, it is common for systems to also include caches that may be shared by multiple processing elements. For example, systems often adopt a hierarchy of caches, including not only one or more levels of local caches that are associated with particular processing elements, but also lower level caches that can cache data for access by multiple processing elements.

When a cache is shared with multiple processing elements, then in order for it to be effective in improving the performance of those processing elements there is typically a requirement for that cache to be relatively large. It is also often the case that steps are taken to seek to ensure that any performance improvements resulting from the use of the cache are shared amongst all of the associated processing elements that can access it. This can be difficult to achieve with a static allocation of the cache resources amongst the different processing elements. However, trying to provide a more fine-grained management of the cache resources to take account of different workload scenarios within the system can significantly increase complexity of the cache, and may require software to monitor the current system operating scenario in order to detect when the policy used to allocate the cache resources should be changed, with an application programming interface (API) typically then being needed to enable the software to reconfigure the allocation of the cache resources accordingly.

SUMMARY

In one example arrangement, there is provided an apparatus comprising: a cache storage to cache data associated with memory addresses; a first interface to receive access requests, where each access request is a request to access data at a memory address indicated by that access request; a second interface to couple to a memory controller used to control access to memory; and cache control circuitry to control allocation of data into the cache storage in accordance with a power consumption based allocation policy that seeks to select which data is cached in the cache storage with the aim of conserving power associated with accesses to the memory via the second interface; wherein a given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage.

In another example arrangement, there is provided a method of operating a cache storage to cache data associated with memory addresses, comprising: receiving at a first interface access requests, where each access request is a request to access data at a memory address indicated by that access request; coupling a second interface to a memory controller used to control access to memory; and controlling allocation of data into the cache storage in accordance with a power consumption based allocation policy that seeks to select which data is cached in the cache storage with the aim of conserving power associated with accesses to the memory via the second interface; wherein a given access request is provided with associated cache hint information providing one or more usage indications for given data at the memory address indicated by that given access request, and the associated cache hint information is referenced when applying the power consumption based allocation policy to determine whether to cache the given data in the cache storage.

In a still further example arrangement, there is provided a non-transitory computer-readable medium to store computer-readable code for fabrication of an apparatus comprising: a cache storage to cache data associated with memory addresses; a first interface to receive access requests, where each access request is a request to access data at a memory address indicated by that access request; a second interface to couple to a memory controller used to control access to memory; and cache control circuitry to control allocation of data into the cache storage in accordance with a power consumption based allocation policy that seeks to select which data is cached in the cache storage with the aim of conserving power associated with accesses to the memory via the second interface; wherein a given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
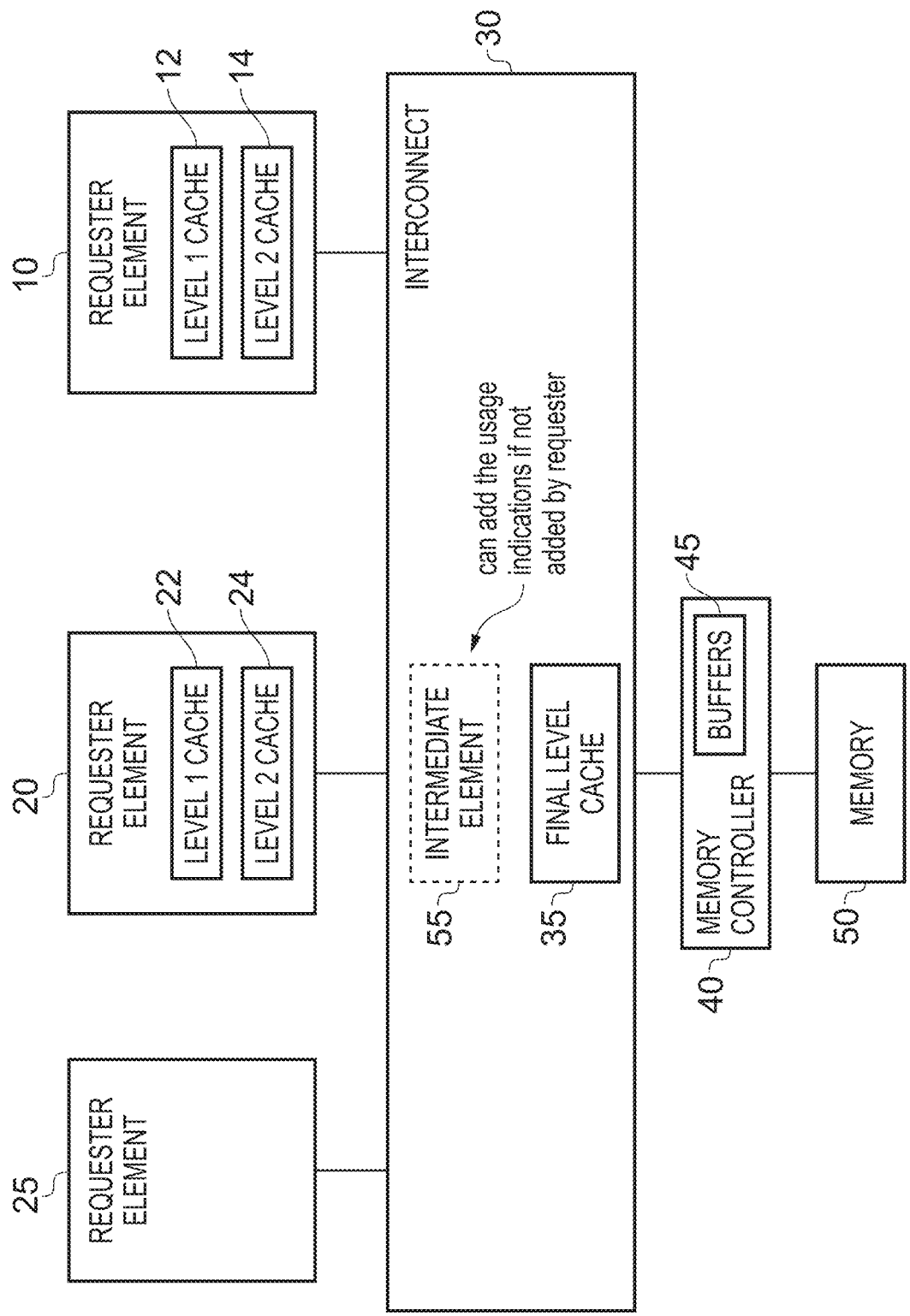
FIG. 1 is a block diagram of a system in accordance with one example implementation.

In accordance with the techniques described herein, the underlying premise for existence of at least one cache within a system is changed, in that for such a cache the aim is not per se to provide a performance improvement for any particular processing element that has access to that cache, but instead to seek to use the cache to reduce power consumption associated with accesses to memory. In particular, a significant proportion of the power consumption within a system can arise due to accesses made to memory, either to write data to memory or to read data from memory. The aim of the techniques described herein is to seek to reduce the volume of such activity and/or influence the ordering of accesses to memory, so as to seek to reduce the overall power consumption associated with such memory accesses.

To achieve this aim, rather than focusing on which processing element is seeking to use the cache, emphasis is instead placed on how the data seeking to be accessed is going to be used, with information indicative of anticipated usage then being used to influence whether data is allocated into the cache or not.

More particularly, in accordance with the techniques described herein, an apparatus is provided that has a cache storage for caching data associated with memory addresses, a first interface to receive access requests, where each access request is a request to access data at a memory address indicated by that access request, and a second interface to couple to a memory controller used to control access to memory. Further, cache control circuitry is provided to control allocation of data into the cache storage in accordance with a power consumption based allocation policy that seeks to select which data is cached in the cache storage with the aim of conserving power associated with accesses to the memory via the second interface. To enable the power consumption based allocation policy to be applied, a given access request considered by the cache control circuitry may be provided with associated cache hint information providing one or more usage indications for given data at the memory address indicated by that given access request. The cache control circuitry can then be arranged to reference the associated cache hint information when applying the power consumption based allocation policy in order to determine whether to cache the given data in the cache storage or not.

By such an approach it is possible to significantly reduce the power consumption associated with accesses to memory when compared with normal allocation policies that aim to increase the performance of associated processing elements. When using the techniques described herein, performance improvements may still arise through use of the cache, but are not the primary focus when the cache control circuitry is making decisions as to whether to cache the data associated with an access request or not.

Other benefits arise from the use of such a power consumption based allocation policy. For instance, there is no requirement to provide for dynamic reconfiguration of the cache resources by software based on monitoring of the current system operating scenario, and instead the power consumption based allocation policy does not need to be changed in dependence on the tasks being undertaken by the processing elements that have access to the cache. Also, the dynamic power saved can scale with the size of the cache, and hence dynamic power can always be saved no matter how small the cache is. Furthermore, the technique described herein can be applied irrespective of the specific cache implementation, and hence for example can be applied irrespective of whether the cache is organised as a fully associative cache or a set associative cache.

In one example implementation, the cache control circuitry may be arranged, on determining through application of the power consumption based allocation policy that the given data is not to be cached in the cache storage, to forward the given access request via the second interface to the memory controller to cause the given data to be accessed in the memory. Hence, in such situations, the access can be forwarded on without delay to memory for handling.

In one example implementation, the cache control circuitry is arranged to seek to cache the given data in the cache storage when, having regard to the one or more usage indications provided by the cache hint information, caching of the given data is anticipated to give rise to a saving in power consumption associated with accesses to the memory via the second interface. Hence, when the cache hint information indicates a usage scenario for the data that is such that a power consumption saving associated with access to memory could potentially be achieved if the data is cached, then the cache control circuitry can seek to cache that data in the cache storage.

The usage indications provided by the cache hint information can take a variety of forms. In one example implementation, one usage indication provided by the cache hint information is a "will be invalidated" indication, which, when set, indicates that the given data is of temporary validity, and in such cases the cache control circuitry may be arranged to seek to cache the given data in the cache storage when the "will be invalidated" indication is set. It can be highly beneficial to cache such data, since if that data is still cached at the time it becomes invalid, then there may be no requirement to write that data to memory at all, and hence no power will be consumed in writing that data to memory. It will be appreciated that there are various ways in which the "set" state of the usage indication can be indicated, and hence for example in one implementation a logic 1 value may indicate the set state, whilst in another implementation the logic 0 value may indicate the set state.

As another example of a usage indication that may be employed, one usage indication provided by the cache hint information may be a multiple access indication, which, when set, indicates that multiple access requests to access the given data are anticipated to be received via the first interface, and the cache control circuitry is arranged to seek to cache the given data in the cache storage when the multiple access indication is set. In particular, if there is an expectation that a particular item of data may be accessed multiple times, then significant power savings can be achieved if that data is retained within the cache whilst those multiple accesses are taking place, since in each case a cache hit will arise, avoiding the need to access memory.

In one example implementation, the multiple access requests that are anticipated may all come from the same processing element, for example the processing element that has issued the initial access request and set the cache hint information to indicate that the data is likely to be accessed multiple times. However, in other instances the multiple accesses may actually occur from different processing elements. It will be appreciated that in instances where such multiple accesses are anticipated, it can be beneficial to store the associated data in the cache, irrespective of which processing elements are going to perform the subsequent accesses, since irrespective of which processing elements perform those accesses, the power consumption savings associated with accesses to memory can still be achieved. In the latter scenario where the multiple accesses may occur from different processing elements, it may still be possible for the processing element issuing the initial access request to anticipate those multiple accesses and set the cache hint information accordingly. Alternatively, some intermediate entity within the system, for example within the path from the processing element to the cache, may be able to detect the likelihood of accesses by other processing elements, and set the cache hint information accordingly.

As a yet further example of a usage indication that may be used in some example implementations, one usage indication provided by the cache hint information may be a "multiple requests to same memory block" indication, which, when set, indicates that the given access request is one of multiple access requests to access data within a same memory block of the memory that are anticipated to be issued, and the cache control circuitry is arranged to seek to cache the given data in the cache storage when the "multiple requests to same memory block" indication is set.

In some example implementations, the "multiple requests to same memory block" indication may only be set if the multiple requests are anticipated to be issued within a given period of time, and in that instance caching of the data for at least that given period of time can be beneficial, as it may allow time for the other requests to be received and cached, and hence for accesses to the memory block to be optimised in due course, for example by evicting the data relating to all of those multiple access requests at the same time or in close succession, so that the memory controller can perform all of those accesses to the memory block whilst the memory block is configured for access.

It is often the case that the structure of a memory device is such that it can be more efficient to perform multiple accesses to a particular memory block rather than needing to keep switching between different memory blocks for each access. For example, in DRAM technology, there is overhead associated with opening a particular page (also referred to as a row) so that accesses can be performed therein, and that overhead can be amortised if multiple accesses can be performed whilst the particular page is open. Whilst in DRAM technology such overhead may be associated with pages, similar issues can arise in other memory technologies in association with other physical structures within the memory, and hence herein the term memory block can be considered to be a physical section of memory that has an associated overhead associated with preparing that memory block for access, and hence for which there can be benefits in terms of power consumption if multiple accesses to the same memory block are performed whilst that memory block has been made available for access.

Hence, it will be appreciated that if the cache hint information can identify that there are likely to be multiple accesses to the same memory block, it can be beneficial to at least temporarily cache the associated data within the cache storage. In particular, as noted earlier, this allows time for the additional access requests targeting the same memory block to also be received and their identified data cached, and in due course the cached data associated with the multiple accesses can be evicted from the cache as a sequence. This then allows the memory controller to perform a more efficient access in respect of the memory, by allowing multiple updates to be made to the memory block whilst the memory block is configured for access.

Not all usage indications need to identify situations in which it is considered preferential to cache the data. For example, one usage indication provided by the cache hint information may be a do not cache indication, which, when set, indicates that the given data should not be cached. In particular, if it is known that there will not be any potential power consumption saving associated with access to memory that would result from caching the given data, then such a usage indication can be used to identify that the data should be passed on directly to the memory controller rather than being cached. This avoids the processing element making the access request from incurring any extra hit on latency associated with the access, since the access can be routed directly onto the memory controller without the cache control circuitry needing to perform any further analysis as to whether the data should be cached or not. In some example implementations it may be appropriate in such a situation still to perform a lookup in the cache to confirm that data at the memory address specified by the access request is not already stored in the cache, in order to guarantee coherency of the data. However, this check can typically be performed in parallel with the memory access so as to avoid adding latency to the processing of the access request.

It should be noted that it is not necessary for every access request to provide cache hint information. In particular, in one example implementation, the cache control circuitry may be arranged, in the absence of any set usage indications, to assume that caching of the given data is not anticipated to give rise to a saving in power consumption associated with accesses to the memory via the second interface. In such situations, the cache control circuitry may still be allowed to decide to cache the data, but the lack of cache hint information merely indicates that there is no known power savings that would arise from doing so. Nevertheless, it may still be beneficial to cache the data for other reasons. For example, if there is space within the cache to accommodate the data without needing to evict any other data, then caching the data may give rise to some performance benefits.

There are a number of ways in which the cache hint information may be associated with the given access request. For example, a requester element may be arranged to generate the cache hint information for associating with the given access request when the given access request is issued by the requester element. As another example, an intermediate element, located in a path between the requester element and the first interface, may be arranged to generate the cache hint information based on analysis of other information associated with the access request. By way of specific example, such an intermediate element may be able to make use of information already provided for use by another entity, such as a system memory management unit (SMMU), in order to infer usage information for the data.

In accordance with one example implementation, the cache control circuitry is arranged, on determining that the given data should be cached in the cache storage but where no entry in the cache storage is currently available, to apply a power consumption based eviction policy in order to seek to select a victim entry within the cache whose currently cached data is to be evicted from the cache storage to make room for the given data, with the aim of conserving power associated with accesses to the memory via the second interface. Hence, by applying the power consumption based eviction policy, the cache control circuitry can be arranged to seek to identify data currently stored within the cache that is likely to give less power consumption savings in respect of access to memory than the data that is identified by the current access request, and in the event of identifying such a situation the existing data can then be evicted to make room for the data associated with the current access request.

The cache storage can be configured in a variety of ways, but in one example implementation comprises a plurality of entries and each entry has usage indication information associated therewith that is populated at the time data is allocated into that entry by the cache control circuitry. The cache control circuitry may then be arranged, when applying the power consumption based eviction policy, to seek to select the victim entry from one or more candidate entries for eviction, in dependence on the usage indication information associated with each of the one or more candidate entries for eviction. For instance, that usage indication information can be used to assess, at least in relative terms, the potential power consumption savings associated with access to the memory that may be achieved as a result of that data being cached.

In one example implementation, the cache control circuitry is further arranged, when seeking to select the victim entry, to take into account the one or more usage indications provided by the cache hint information for the given data. Hence, by such an approach, a comparison can be made between the perceived power consumption benefits that may be obtained by caching the given data, and the perceived power consumption benefits that may be obtained in respect of the cached data in each candidate entry for eviction, with the decision then been taken as to whether to evict any existing data to make room for the given data.

There are various ways in which the cache control circuitry can be arranged to perform the above analysis. In one example implementation, the cache control circuitry is arranged to associate priority levels with the entries of the cache storage based on their associated usage indication information, such that a first given entry has a higher priority level than a second given entry when, based on comparison of the usage indication information of the first given entry and the usage indication information of the second given entry, a greater power saving associated with accesses to the memory via the second interface is anticipated by retaining in the cache storage the data cached in the first given entry rather than the data cached in the second given entry. The cache control circuitry can then be arranged, when applying the power consumption based eviction policy, to determine whether any of the one or more candidate entries for eviction are suitable to select as the victim entry, based on the priority levels associated with each candidate entry and the one or more usage indications provided by the cache hint information for the given data.

If desired, additional information can be taken into account when associating priority levels with particular entries of the cache storage. For example, the cache control circuitry may be arranged to associate the priority levels with the entries of the cache storage based on both their associated usage indication information, and an indication of whether the data currently cached in those entries has already been accessed since that data was cached in the cache storage.

When application of the above process results in the identification of multiple candidate entries with priority levels low enough to warrant eviction of the data to make space for the given data, then in one example implementation the candidate entry with the lowest priority level will be chosen for eviction.

However, it is also possible that as a result of applying the above process no suitable candidate entries may be identified. In one example implementation, the cache control circuitry is arranged, on determining, having regard to the one or more usage indications provided by the cache hint information for the given data, that there is no entry with a priority level low enough to indicate that a power saving associated with accesses to the memory via the second interface is anticipated by evicting that entry's currently cached data to make space for the given data, to forward the given access request via the second interface to the memory controller to cause the given data to be accessed in the memory. Hence, in such situations, the access request will merely be propagated on to the memory controller in order to cause the data to be accessed in memory.

The entries within the cache storage for which separate usage indication information is provided can vary dependent on implementation. However, in one example implementation, each entry is a cache line, and the usage indication information is hence provided for each cache line.

In one example implementation, the cache control circuitry may be arranged, on occurrence of one or more events, to apply a cleaning policy to evict from one or more entries of the cache storage dirty data that is more up to date than a copy of that data stored in the memory. The cleaning policy can be arranged to select the entries whose dirty data is to be evicted with the aim of conserving power associated with accesses to the memory via the second interface. The one or more events that can trigger the performance of the cleaning policy can take a variety of forms, but by way of example such an event may be an indication that the memory controller/memory has spare capacity to handle accesses resulting from such cleaning activities.

The cleaning policy can take a variety of forms, but in one example implementation is such that the cache control circuitry is arranged to select entries to evict in accordance with one or more of the following rules:

any entry having associated usage indication information set to indicate that the current cached data in that entry is of temporary validity will be inhibited from being selected for eviction unless all entries in the cache storage have their associated usage indication information set to indicate that the current cached data in those entries is of temporary validity;

when multiple entries that are targeting a same memory block in the memory have dirty data cached therein, the cache control circuitry is arranged to evict the cached data in those multiple entries together in order to allow the memory controller to update the data from those multiple evicted entries whilst the same memory block is accessed;

in the absence of there being multiple entries that are targeting the same memory block in the memory, the cache control circuitry is arranged to select a sequence of entries for eviction whose cached data is associated with different banks within the memory.

By such an approach, it will be appreciated that the cache control circuitry can seek to target its cleaning activities in a way that will enable the memory controller to optimise the accesses it performs to memory, with the aim of reducing the power consumption associated with performing such accesses.

To assist in making the above decisions, the cache control circuitry can be provided with knowledge of how the memory is organised, and hence the memory allocation split within the memory controller. Such information could, for example, be programmed into the cache control circuitry at boot time.

The above described techniques can be applied in association with any suitable cache storage. However, in one example implementation, the above described apparatus is arranged to be incorporated within a system comprising a hierarchical arrangement of caches, and the cache storage forms a final level cache in the hierarchical arrangement of caches.

In one example implementation, the apparatus may further comprise a storage structure that is configured to provide both the cache storage and an additional cache storage. Further, additional cache control circuitry can be provided to control allocation of data into the additional cache storage in accordance with an alternative allocation policy that is different to the power consumption based allocation policy. Hence, in such an implementation, the overall resources of the storage structure can be split so as to provide two different forms of cache storage that each have a different allocation policy applied in respect of them.

Such a configuration can be useful in a variety of situations, and provide a very flexible mechanism for caching data. For instance, in one example implementation the first interface may be arranged to receive access requests from multiple sources, one source being a cluster of processing elements. The first interface can then be arranged to direct access requests received from the cluster of processing elements to the additional cache control circuitry, and to direct access requests received from at least one other source to the cache control circuitry. In such an arrangement, the alternative allocation policy may be such as to cause the additional cache storage to be used to cache data with the aim of improving performance of access to that data by the processing elements of the cluster. Hence, part of the storage structure can be configured to provide the additional cache storage, in order to provide a conventional, performance orientated, cache for use by the cluster of processing elements, whilst the remainder of the resources of the storage structure can be configured to provide the earlier-described cache storage that can be used by other system resources, and whose allocation policy is biased towards seeking to reduce/minimise the power consumption associated with performing accesses to the memory.

In one particular example implementation, the storage structure may be configurable to allow an amount of the storage structure used to provide the cache storage and an amount of the storage structure used to provide the additional cache storage to be dynamically adjusted. By such an approach, the additional cache storage can be sized appropriately for the current needs of the cluster, with the remainder of the available resources of the storage structure being used to provide the cache storage for use by the other system resources.

Particular examples will now be described with reference to the Figures.

FIG. 1 is a block diagram of a data processing system in accordance with one example implementation. In this example, multiple processing elements (also referred to herein as a requester elements) 10, 20, 25 are coupled via an interconnect 30 to a memory controller 40 that controls access to memory 50. One or more of the requester elements 10, 20, 25 may have one or more levels of local cache associated therewith. In the particular example shown, the requester element 10 has an associated level 1 cache 12 and an associated level 2 cache 14, and similarly the requester element 20 has an associated level 1 cache 22 and associated level 2 cache 24. Typically, the level 1 cache is smaller than the level 2 cache, and enables the associated requester element to access data stored in that level 1 cache more quickly than would be the case if the data is not stored in the level 1 cache but is stored in the level 2 cache.

If a requester element issues an access request for data that is not stored in any of its local caches, or indeed if the requester element does not have any local caches, then the access request is propagated from the requester element to the interconnect 30. The interconnect may include a system cache (also referred to in FIG. 1 as a final level cache) 35 that is accessible to the various requester elements, and which can cache a subset of the data held in memory 50. However, if the requested data is not present in the final level cache 35, then the access request can be propagated on to the memory controller 40, to cause an access to be performed within memory 50 in order to access the required data.

The memory controller 40 can be provided with a number of buffers 45 in which to temporarily store pending access requests, giving the memory controller some flexibility to group requests so as to improve the efficiency of accesses to the memory 50. For instance, it is often the case that the memory 50 is structured in such a way that individual memory blocks have an overhead associated with accessing them, such that it can be more efficient to perform a number of accesses to an individual memory block whilst that memory block is configured for access. For example, in DRAM technology, it is necessary to activate a memory page before an access is performed within that memory page, and then to close the memory page afterwards, and hence it can be more efficient to perform multiple accesses to a memory page whilst it is activated. Whilst the memory controller can seek to optimise accesses to the memory, the ability to optimise those memory accesses is constrained by the contents of the buffers 45 at any particular point in time, and in particular whether the various access requests within the buffers allow for any efficiencies to be realised.

Figure 2:
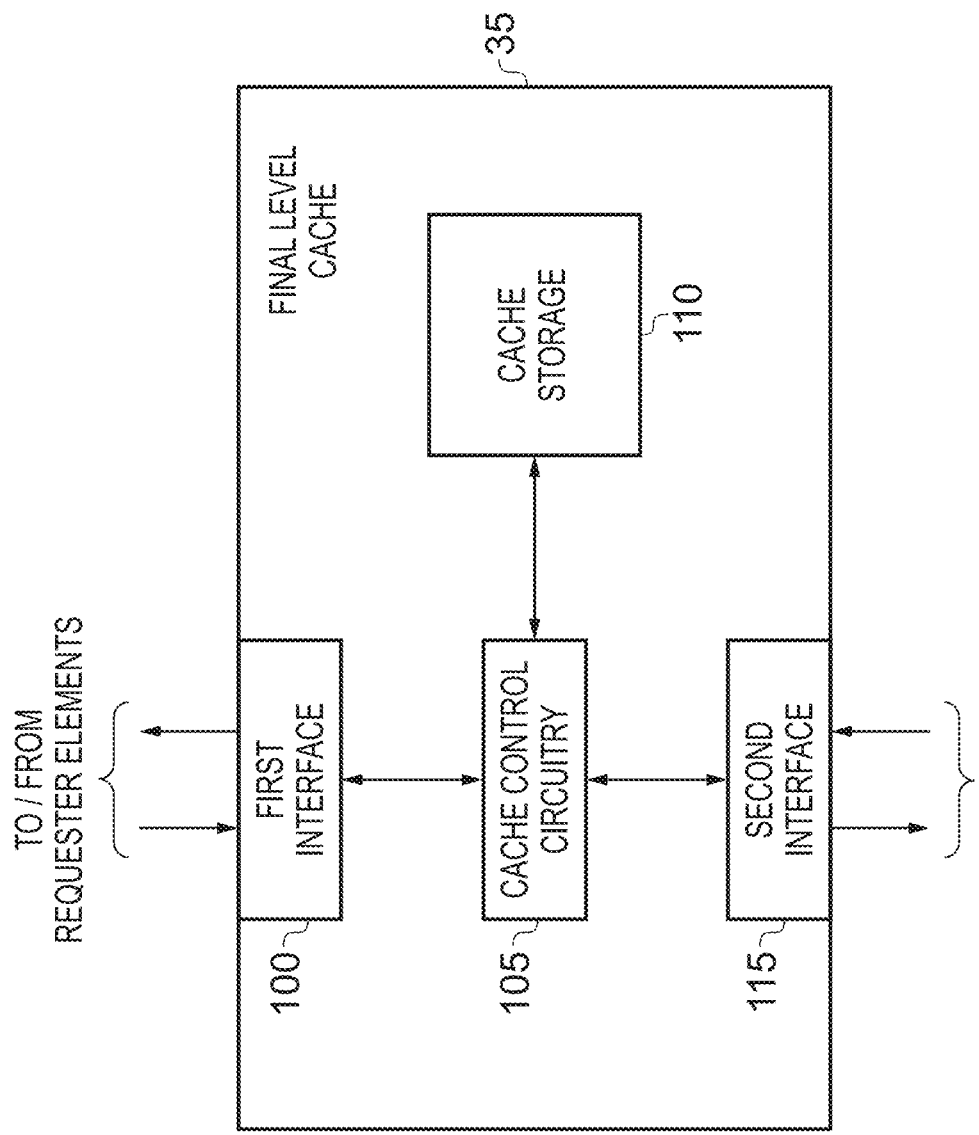
FIG. 2 is a block diagram illustrating components provided within a final level cache in accordance with one example implementation.

As mentioned earlier, it is typically the case that cache resources are utilised so as to seek to improve performance of the requester elements making use of those cache resources. However, in accordance with the techniques described herein, the final level cache 35 is instead organised so as to seek to cache data that will enable a reduction in the power consumption associated with accesses to memory. In particular, rather than focusing on which processing element is seeking to use the cache, emphasis is instead placed on how the data seeking to be accessed is expected to be used, with that information then being taken into account when deciding whether to cache any particular data item in the final level cache 35. More details of components provided within the final level cache 35 will now be discussed with reference to FIG. 2.

The final level cache 35 has a first interface 100 that is arranged to receive access requests that may be issued by any of the requester elements 10, 20, 25. Each access request typically identifies a memory address indicating where in the memory address space the data that is seeking to be accessed resides. The access request is forwarded to the cache control circuitry 105, which can then perform a lookup operation within the cache storage 110 in order to determine whether the data that is the subject of the access request is cached within the cache storage. If the data is present in the cache, then the access can proceed with reference to the data in the cache storage. Hence, for a read access request, the data can be read from the cache storage and returned to the requester element. For a write access, the data can then typically be written into the cache line that stores the previous version of the data, overwriting the old data with the new data. Whether at the same time the write data is also propagated on by the second interface 115 to cause a write update to take place in memory will typically depend on whether the address relates to a write back region of memory (in which case the cache contents are allowed to be more up-to-date than the version stored in main memory, in such instances the cache contents being marked as dirty so that it is known that in due course those contents need to be written back to main memory when the data is evicted from the cache) or a write through region of memory (in which case the memory is also updated when the cache contents are updated).

In the event of a miss within the cache storage 110, the cache control circuitry 105 can then forward the access request on to the second interface 115, where it can then be propagated on to the memory controller 40, in order to cause the access to take place within memory 50.

The cache control circuitry 105 is also arranged to control allocation of data into the cache storage, and in accordance with the techniques described herein is arranged to employ a power consumption based allocation policy that seeks to select which data is cached in the cache storage with the aim of conserving power associated with accesses to the memory via the second interface. To assist the cache control circuitry in this process, an access request received by the final level cache may be supplemented with cache hint information that provides one or more usage indications for the data at the memory address indicated by the access request. Based on such usage indications, the cache control circuitry can then determine instances where caching of the data is likely to give rise to a reduction in power consumption associated with accessing memory 50, and in those instances to seek to cache that data within the cache storage. More details of how such usage indications are used by the cache control circuitry will be discussed in more detail later with reference to the remaining figures.

Such usage indications may be added by a requester element at the time an access request is issued. However, alternatively, an intermediate element in the path between the requester element and the final level cache may be arranged to add such usage indication information to the access request. Returning to FIG. 1, such an intermediate element 55 could for example be provided within the interconnect 30, and may make use of information that has already been added in association with the access request in order to infer from that information how the data is likely to be used, and hence to set the usage indication information accordingly.

Purely by way of specific example, a system memory management unit (SMMU) may be arranged to perform address translation to convert virtual addresses into physical addresses, and that address translation may vary dependent on process identifiers or the like indicating which process an access request relate to. Based on such process identifiers, it may be possible to infer likely usage of the data, and set usage indications accordingly. Considering by way of example a graphics processing unit (GPU) or a neural processing unit (NPU), stream identifiers may be associated with access requests to identify different processing contexts. For instance, different stream identifiers may be associated with different output feature maps (OFMs). It may be known that the data associated with one particular output feature map is likely to be used multiple times, and hence such usage can be inferred from the stream identifier. If it is known that data is likely to be used multiple times, then power consumption associated with access to memory may be significantly reduced if the data is cached, since it may then be possible to service those multiple access requests using the cached copy of the data, and thereby avoid accesses to memory. It will be appreciated that this is merely one example scenario where usage of data may be inferred from other information already provided in association with an access request, and that there are many other scenarios where usage could also be inferred from information associated with an access request.

Returning to FIG. 1, it will be appreciated that FIG. 1 represents a simplified system for the purposes of illustration, and any particular implementation may include a number of additional elements. Further, whilst some components have been shown as being provided externally to the interconnect 30, in other implementations those components could be considered to be part of the functionality of the interconnect. For example, in some implementations a memory controller may be provided within the interconnect 30.

Figure 3A:
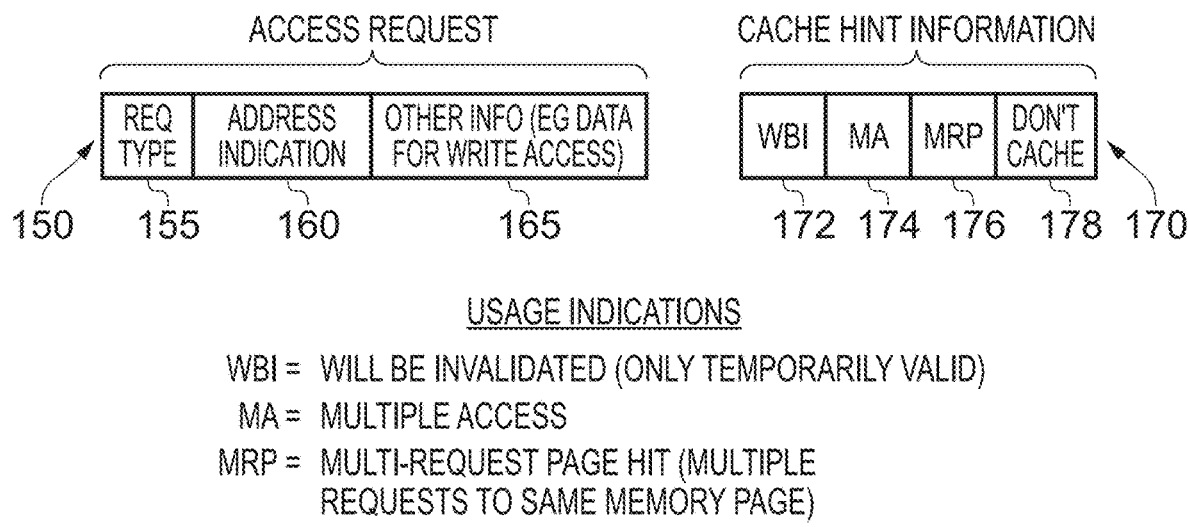
FIG. 3A illustrates how cache hint information may be associated with access requests in accordance with one example implementation, whilst

FIG. 3A schematically illustrates an access request and associated cache hint information that may be provided for that access request, in accordance with one example implementation. The access request 150 will include a number of fields. For example, a request type field 155 may be used to identify the type of access request be performed, for instance to identify whether the access request is a write access request or a read access request. Similarly, an address indication field 160 may be used to provide an address indication used to determine the address of the data that is the subject of the access request. One or more other fields 165 may also be provided in order to convey additional information relevant to the access request. For example, for a write access request, the write data may be specified within one such field.

In accordance with the techniques described herein, one or more usage indications may be provided as cache hint information 170 associated with the access request. Such cache hint information may be provided as one or more additional fields of the access request, or could alternatively be provided by one or more sideband signals propagated in association with the access request.

The usage indications forming the cache hint information 170 may take a variety of forms, but in the example shown four different types of usage indications are provided, and one or more of those usage indications may be set for any particular access request. A "will be invalidated" (WBI) usage indication 172 can be used to identify that the data that is the subject of the access request will be invalidated in due course, and hence is data of a temporary nature. If this usage indication is set, then the cache control circuitry 105 can infer that it will be beneficial to cache the data in the cache storage 110, since there is a possibility that the data will never need to be written out to memory. In particular, if the data can be retained within the cache for the entire period that data is valid, then once the data subsequently becomes invalid it can merely be removed from the cache without any need to write that data to the memory. In particular, it may be possible to retain the cache line containing the data as a valid cache line until a specific invalidate command is received confirming that the data is now no longer valid, at which point the cache line may merely be invalidated.

As another example of a usage indication, a multiple access (MA) usage indication 174 may be provided, which can be set when it is anticipated that the data that is the subject of the access request will be accessed multiple times. For example, it may be the case that such data will be read more than once, and accordingly such a usage indication can be used by the cache control circuitry to identify that the data should preferably be cached, since it may then be possible to service each subsequent access request for that data using the cached copy of the data, thereby avoiding any further accesses to main memory.

As a still further example of a usage indication, a multi-request page hit (MRP) usage indication 176 can be set when it is anticipated that there will be multiple requests to the same memory page as the memory page containing the memory address of the data that is the subject of the access request. Again, it can be beneficial to cache the data associated with an access request whose usage indication has the MRP field set, since if the data can be retained within the cache until those other access requests targeting the same memory page have also been received, then it may be possible to optimise the memory accesses subsequently required in order to store the data of those multiple access requests into memory. For instance, when adopting such an approach, the cache lines containing such data could be evicted as a series of evictions, thus causing the buffers 45 of the memory controller 40 to be populated with a series of access requests that can efficiently be processed by the memory controller to reduce power consumption within the memory. In particular, as mentioned earlier, the relevant memory page can be opened, and then all of the accesses to data within that page can be performed before the memory page is closed, thereby significantly reducing power consumption when compared with an alternative approach where the memory page may have to be opened and closed multiple times in order to process the various access requests.

It should be noted that not all usage indications need to provide a positive indication that caching of the data will reduce power consumption associated with accesses to memory. Hence, by way of example, a don't cache usage indication 178 could be provided that can be set to specifically identify that the data should not be cached, but should instead be issued directly to the memory controller. By such an approach, this avoids the processing element that is making the access request from incurring any extra hit on latency associated with the access, since the access can be routed directly to the memory controller without the cache control circuitry needing to perform any further analysis as to whether the data should be cached or not. As mentioned earlier, in order to ensure data integrity, it may be appropriate to perform a lookup within the cache in order to check that data at the specified memory address is not already stored in the cache, but this lookup can typically be performed in parallel with the memory access as there is an expectation that the data is likely not in the cache. Appropriate actions can then be taken to ensure coherency if needed. For example, for a read access request, if data at the specified address is already in the cache, then the memory data access can be dropped, and instead the data present in the cache can be used to service the read access request. For a write access request, if data at the specified address is stored in the cache then the cached data can merely be invalidated, as the updated data is being written to memory.

In the event of a partial write, i.e. when not a complete cache line's worth of data is being written, then it may be necessary to stall the memory write operation temporarily, in order to allow the cache lookup to be completed. In the event of a hit, the cached data can then be merged with the data that is the subject of the current access request, so that the access to memory performs an update of an entire cache line's worth of data, and the relevant cache line contents within the cache can then be invalidated. Alternatively, the current write data specified by the access request can be written into the cache line to create an updated cache line, with the cache line at that point remaining valid.

It should also be noted that there is no requirement for every access request to provide cache hint information. In the absence of cache hint information, the cache control circuitry may merely decide not to cache the data and instead propagate the access request on to the memory controller, or may under certain circumstances decide to cache the data, for example if there is available space within the cache without needing to evict any existing data from the cache.

Figure 3B:
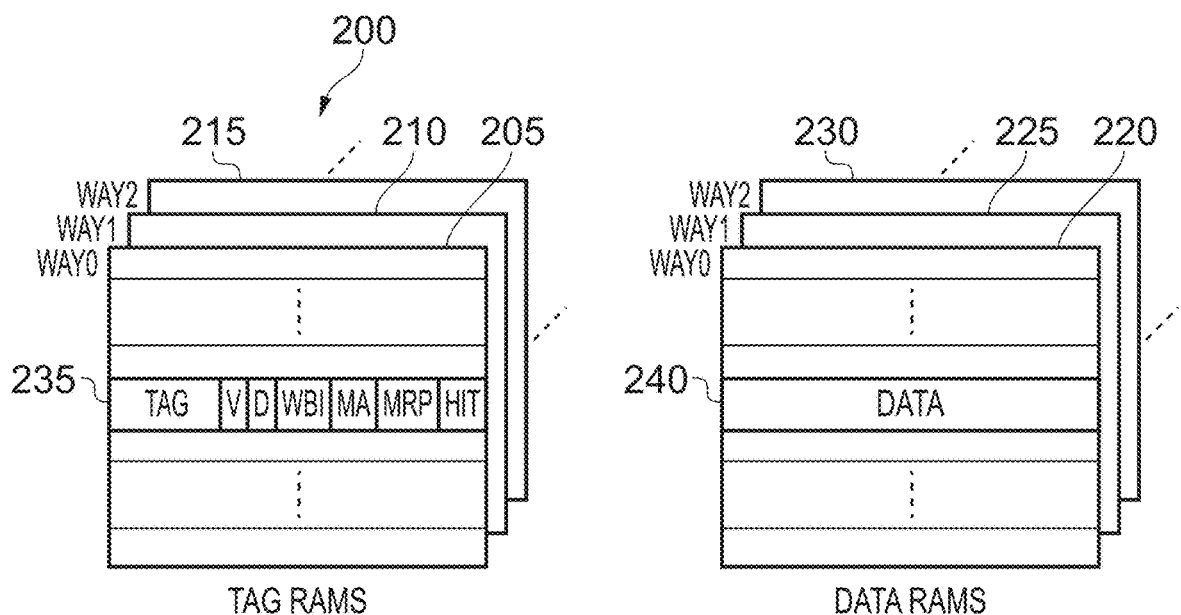
FIG. 3B illustrates how usage indication information may be maintained in association with data cached within the cache lines of a cache in accordance with one example implementation.

When data is allocated into the cache by the cache control circuitry 105, then in accordance with one example implementation any usage indication information is also captured in association with the cached data for subsequent reference by the cache control circuitry. In particular, usage indication information can be stored in association with each cache line of data in accordance with one example implementation. FIG. 3B illustrates this by way of example, with reference to a set associative cache 200 that comprises a number of tag RAMS 205, 210, 215 and a corresponding number of data RAMS 220, 225, 230. For each cache line 240 within a data RAM, there is a corresponding tag entry 235 within the associated tag RAM, and that tag entry is supplemented to capture the usage indication information.

Hence, in addition to a tag entry capturing a tag portion of the address used when detecting whether there is a hit in the cache, and storing valid and dirty indications to identify whether the data is valid or invalid, and whether the data is more up-to-date or not than the version held in memory, the tag entry also can include WBI, MA, and MRP indications to identify whether the data held in the cache line has been flagged as data that is beneficial to hold within the cache having regard to the aim of reducing power consumption associated with accesses to memory. As will be discussed in more detail later, in one example implementation an additional field, called a hit field, is also provided, which can be set once the data allocated in the associated cache line has been accessed at least once after allocation into the cache line.

Figure 4:
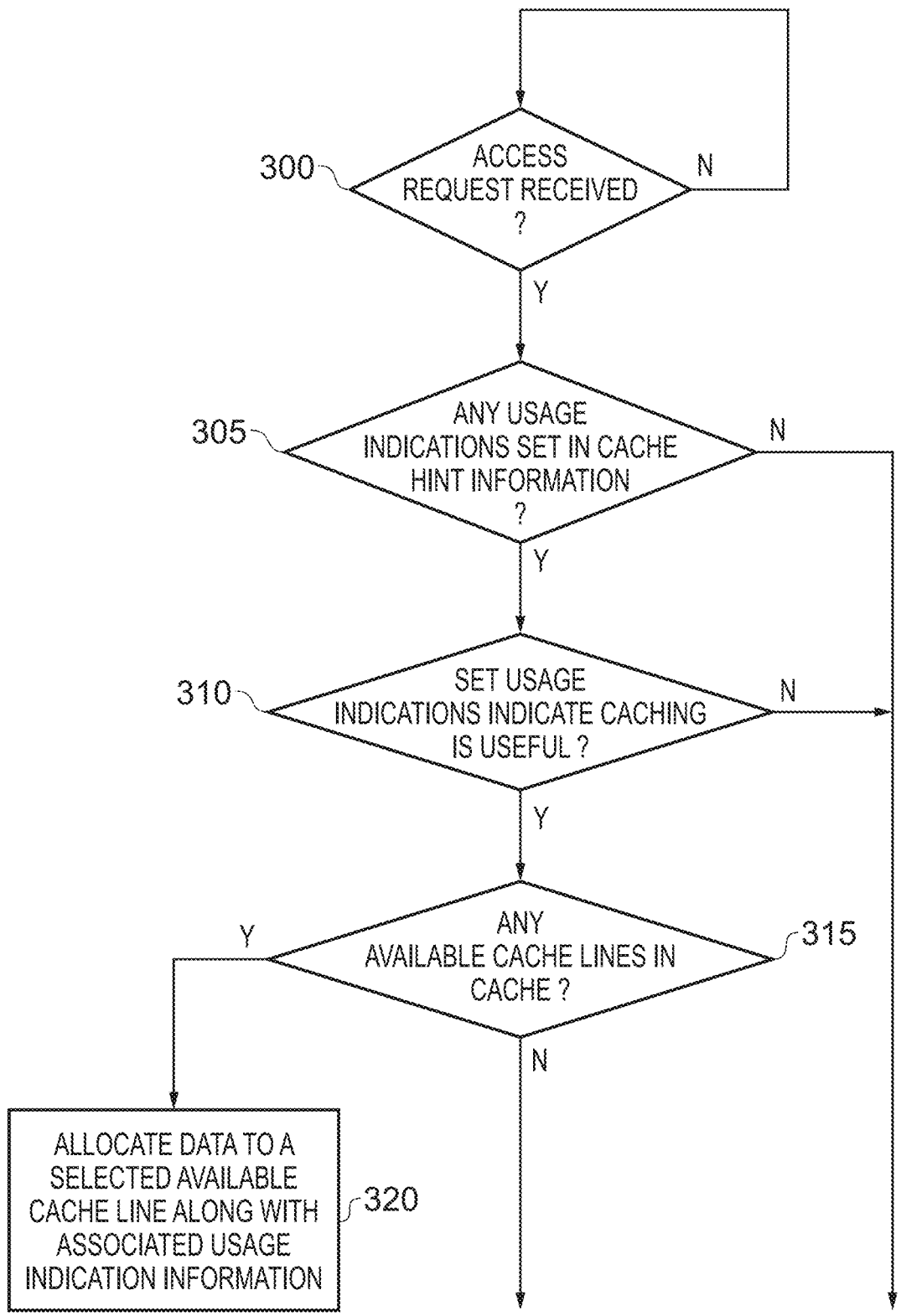
FIG. 4 is a flow diagram illustrating the handling of an access request by the cache in accordance with one example implementation.
Figure 4:
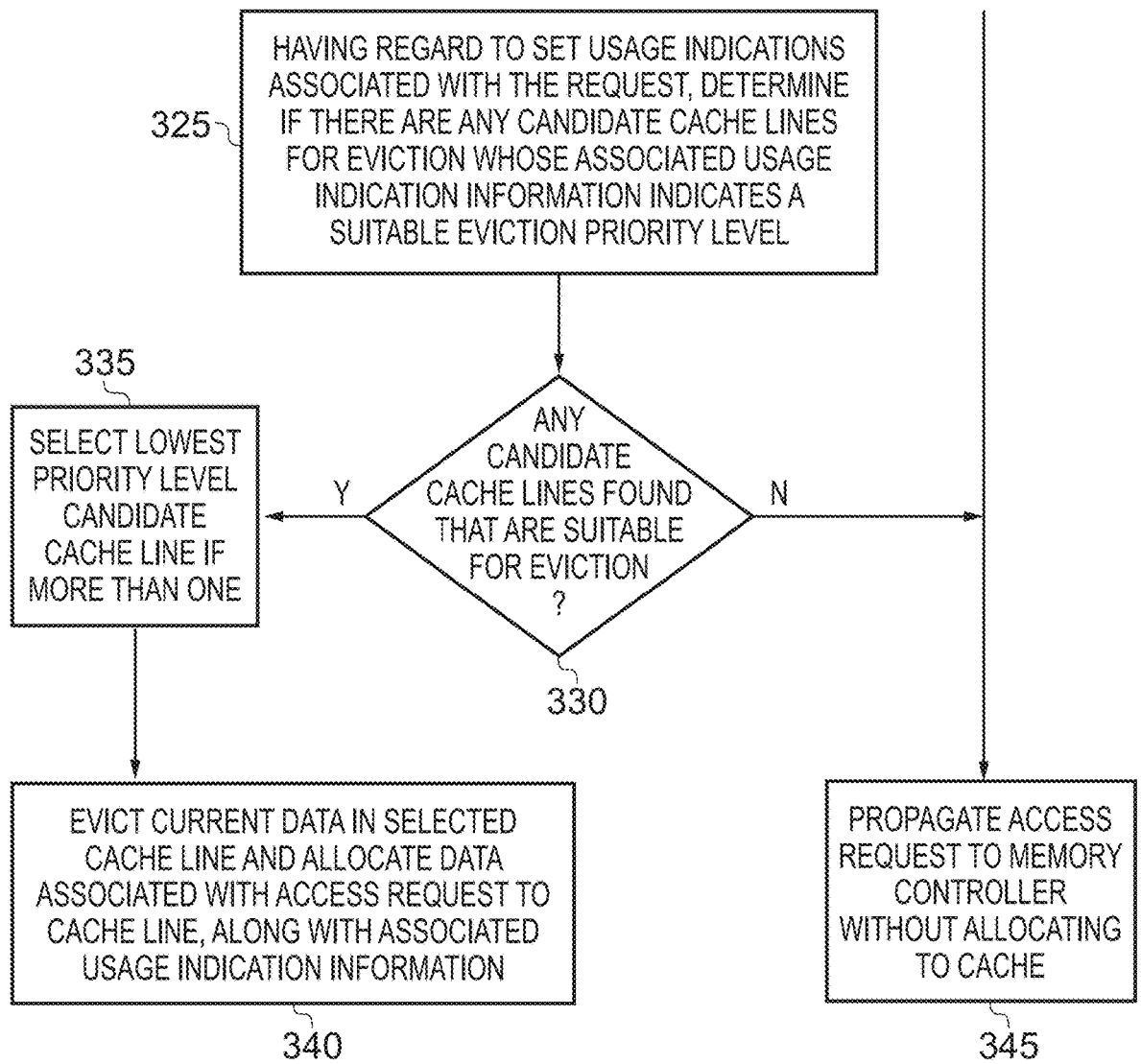

FIG. 4 is a flow diagram illustrating how an access request is processed when it is received by the cache control circuitry 105 of the final level cache 35. At step 300, it is determined whether an access request has been received, and once it has the process proceeds to step 305 where it is determined whether any usage indications have been set in the cache hint information of that access request. If not, the process proceeds to step 345 where in one example implementation the access request is propagated to the memory controller without allocation of the data into the cache. If desired, the cache control circuitry may decide to cache such data within the cache rather than merely propagating it on to the memory controller, for example if there is space available within the cache without needing to evict any data currently held in the cache.

However, if one or more usage indications are set within the cache hint information, then the process proceeds to step 310 where it is determined whether the set usage indications indicate that caching is useful. At this stage, the cache control circuitry is applying the earlier-discussed power consumption based allocation policy, and as will be appreciated from the earlier discussions, it will be determined that caching will be useful from a power conserving point of view if any of the WBI, MA or MRP usage indications are set. However, if the don't cache usage indication is set, then this indicates that caching will not be useful, and in this event the process follows the no path from step 310, causing the access request to be propagated to the memory controller at step 345 (as mentioned earlier a lookup in the cache will typically be performed in parallel to confirm that there is a miss, as otherwise some coherency action may be needed to ensure data coherency).

Assuming the set usage indications do indicate that caching is useful, then the process proceeds to step 315 where it is determined whether there are any available cache lines in the cache for storing the data that is the subject of the current access request. It will be appreciated that, depending on how the cache is structured, there may only be a subset of the entries within the cache that can be used for the data associated with any specific address. For instance, in a set associative cache, a portion of the address will be used to identify a particular set within the cache, and the data can only then be cached within an available cache line of that set (typically each set having one cache line in each way of the set associative cache). However, if the cache is organised as a fully associative cache, then in principle the data can be cached in any available cache line.

If there is at least one available cache line in the cache for storing the data that is the subject of the current access request, then the process proceeds to step 320 where the data is allocated into a selected available cache line, along with the associated usage indication information. As discussed earlier, this usage indication information can be captured within the corresponding tag entry of the cache line used to store the data.

If at step 315 it is determined that there are not currently any available cache lines that could store the data, then the process proceeds to step 325 where an assessment is made as to whether there is any lower priority data stored within a cache line that could be evicted in order to make room for the data of the current access request. In particular, at this point the cache control circuitry applies a power consumption-based eviction policy in order to determine whether any candidate entry for eviction within the cache has cached data that is anticipated to give rise to less power consumption benefits than would be associated with storing the data of the current access request in the cache.

Hence, the cache control circuitry can identify one or more candidate entries for eviction, for example the cache lines within the relevant set in the example of a set associative cache, and then compare the usage indication information stored in each of those cache lines with the usage indications provided in association with the access request currently under consideration, in order to decide whether it is appropriate to select one of those candidate entries as a victim entry whose current contents should be evicted in order to make room for the data of the current access request.

In implementing this process, priority levels can be associated with the entries of the cache storage based on their associated usage indication information, such that a first given entry has a higher priority level than a second given entry when, based on comparison of the usage indication information of the first given entry and the usage indication information of the second given entry, a greater power saving associated with accesses to the memory is anticipated by retaining in the cache storage the data cached in the first given entry rather than the data cached in the second given entry.

The manner in which the priority levels are formed, based on the usage indication information, can vary dependent on implementation, but in one example implementation the priority levels are formed as set out in the following table:

| Eviction Order of Priority | WBI | MA | MRP | Hit | Incoming Request Attributes |
|---|---|---|---|---|---|
| 1 | 0 | 0 | 0 | X | WBI or MA or MRP |
| 2 | 0 | 1 | 0 | 1 | WBI or MA or MRP |
| 3 | 0 | 1 | 0 | 0 | WBI |
| 4 | 0 | 0 | 1 | 1 | WBI or MA or MRP |
| 5 | 0 | 0 | 1 | 0 | WBI |
| 6 | 0 | 1 | 1 | 1 | WBI or MA or MRP |
| 7 | 0 | 1 | 1 | 0 | WBI |

In accordance with this priority scheme, a cache line that has the WBI usage indication set will never be evicted to make space for data of the new access request, since it is considered that the most potential power consumption saving is associated with such data. As shown in the above table, the lowest priority is associated with a cache line that has none of the WBI, MA or MRP usage indication bits set ("X" indicates a do not care state and hence it does not matter whether the hit field is set or not in this instance), and such a cache line will be evicted to make room for the data of the current access request if that access request has any of the usage indications WBI, MA or MRP set in association with it.

If none of the candidate entries for eviction are of priority level 1, then priority level 2 is considered. At this point, if any of the candidate entries for eviction have the multiple access usage indication set, but also have the hit bit set to indicate that the data has been accessed at least once since it was allocated, then such data will be evicted to make way for the data of the current access request if that has any of the WBI, MA or MRP bits set.

If none of the candidate entries for eviction are of priority level 2, then priority level 3 is considered. At this point, if a candidate entry for eviction has the multiple access bit set, but the hit bit cleared, then the data in that entry will be evicted if the new access request has the WBI bit set.

The above described process then continues for consideration of priority levels 4, 5, 6 and 7, as necessary, and it will be appreciated that by the end of that process it will either have been determined to evict the current contents of one of the candidate entries in order to make space for the data of the current access request, or it will be determined that no eviction should take place.

Returning to step 325, it is hence determined at step 330 whether any candidate cache lines have been found that are suitable for eviction. If not, the process proceeds to step 345 where the access request is propagated on to the memory controller without the data being allocated into the cache. However, if there is at least one suitable candidate cache line, the process proceeds to step 335 where the lowest priority level candidate cache line is selected if there is more than one, and then at step 340 the current data in the selected cache line is evicted, and the data associated with the access request is then allocated into that cache line, along with the associated usage indication information. It will be appreciated that at this stage, if the access request is a write access request, then the data required to be stored in the cache line will have been provided by the access request, but for a read access request it may still be necessary to obtain the data from memory in order for that data to then be allocated into the selected cache line.

Figure 5:
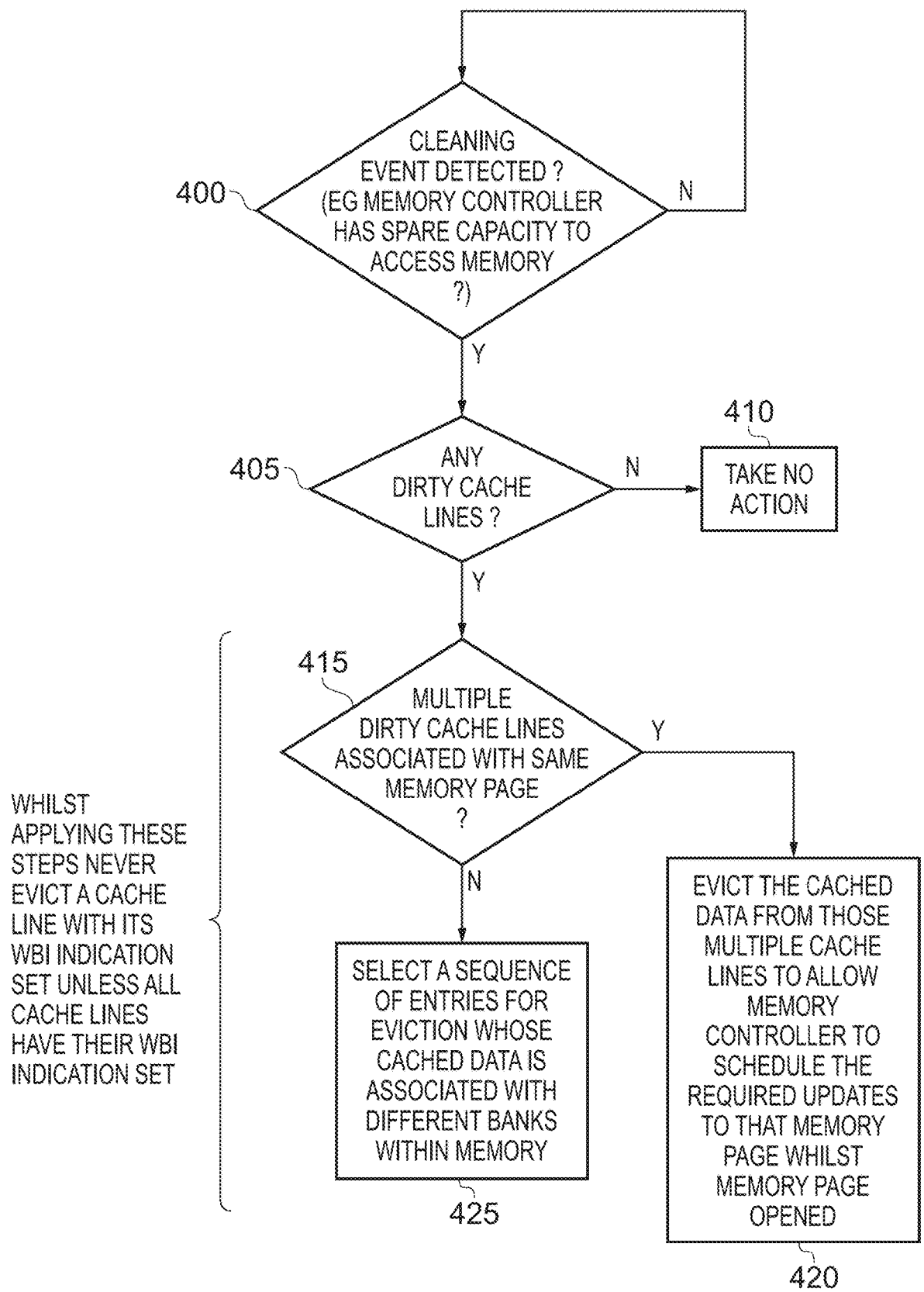
FIG. 5 is a flow diagram illustrating the performance of a cleaning operation in accordance with one example implementation.

FIG. 5 is a flow diagram illustrating a process that can be performed on detection of a cache cleaning event, in accordance with one example implementation. Such a cache cleaning event may be detected for a variety of reasons, but as indicated by step 400 of FIG. 5, such a cleaning event may be detected when it is determined that the memory controller has spare capacity to access memory, for instance when the demand for accesses to memory is less busy than normal. When such a cleaning event is detected, the process proceeds to step 405, where it is determined whether there are any dirty cache lines within the cache. If not, then this indicates that the contents of memory are up to date, and there is hence no need to take any action. Accordingly, the process proceeds to step 410 where the process terminates.

However, assuming there is at least one dirty cache line, the process proceeds to step 415 where it is determined whether there are multiple dirty cache lines associated with the same memory page. If so, the process proceeds to step 420 where the cached data is evicted from those multiple cache lines to the memory controller. This will then allow the memory controller to schedule the required updates to that memory page whilst the memory page is opened, and thereby can enable power consumption savings to be achieved. It should be noted that when assessing step 415, it may be appropriate to implement some delay time to allow for any further access requests to the same memory page to be received by the cache, before any of the data associated with the relevant memory page is evicted.

If there are not determined to be multiple dirty cache lines associated with the same memory page, then the process proceeds to step 425 where the cache control circuitry seeks to select a sequence of cache lines for eviction whose cached data is associated with different banks within the memory. This can be beneficial as different banks can be accessed in parallel, thus improving performance by allowing better utilisation of the memory bus.

As indicated in FIG. 5, when performing the steps 415, 420, 425, it should be noted that in one example implementation the cache control circuitry will never select for eviction a cache line that has its WBI indication set, unless all cache lines have their WBI indication set. In particular, it is considered beneficial to retain such data within the cache for as long as possible, since if such data can be held within the cache for long enough, it will be invalidated and then there will be no need to write the data to memory at all, thereby yielding significant power consumption benefits.

Figure 6:
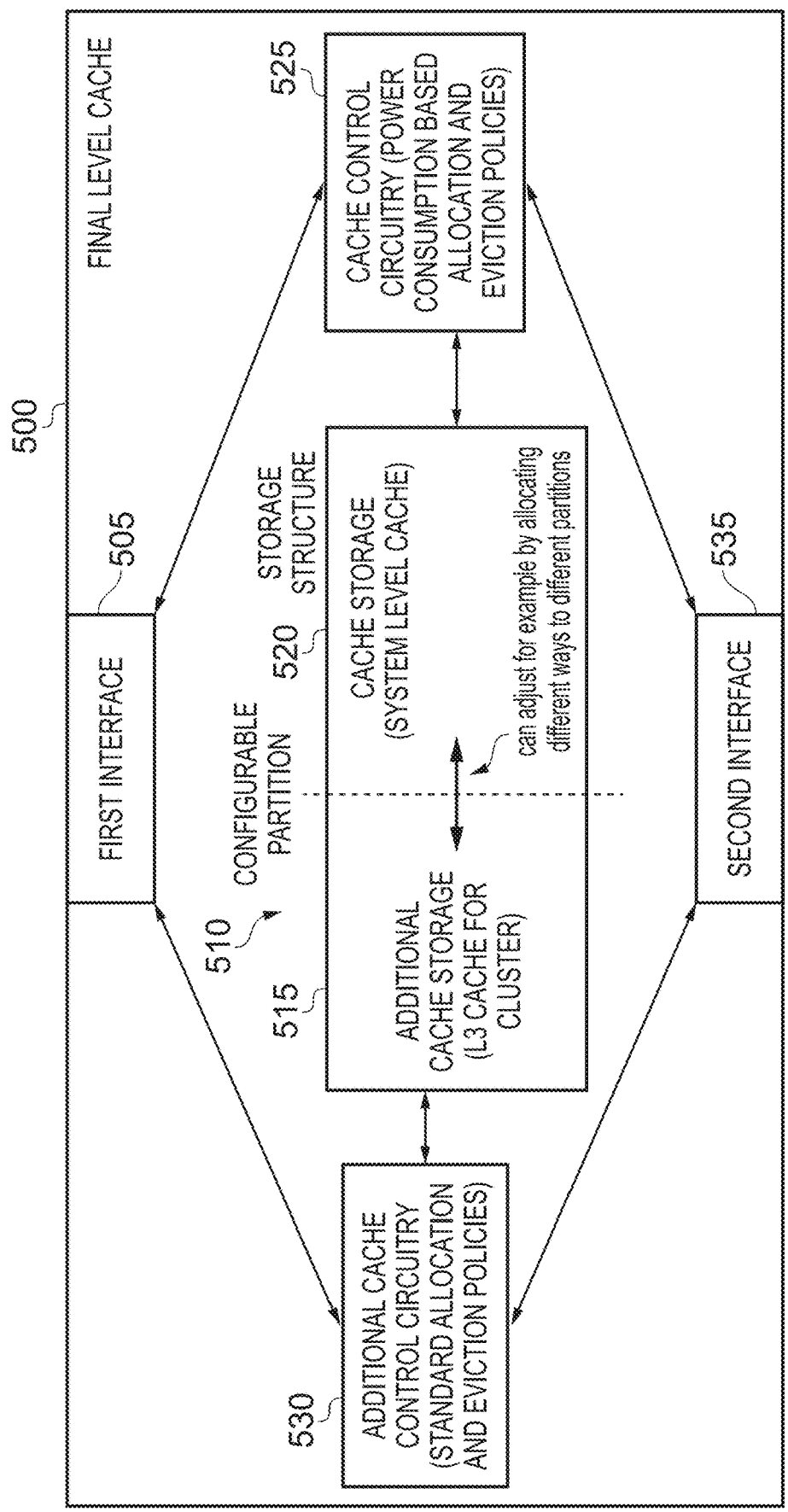
FIG. 6 is a block diagram illustrating components provided within a final level cache in accordance with an alternative example implementation.

FIG. 6 illustrates an alternative implementation of the final level cache where the storage structure used to cache data may be partitioned into two parts. Hence, as shown, the final level cache 500 can have a first interface 505 and a second interface 535, which operate in much the same way as the first and second interfaces 100, 115 described in relation to the example implementation of FIG. 2. The storage structure 510 may have a portion 520 used to provide the earlier-described cache storage (also referred to herein as a system level cache), with associated cache control circuitry 525 that operates in the same way as the earlier-discussed cache control circuitry 105 of FIG. 2, and hence employs a power consumption based allocation policy and a power consumption based eviction policy.

However, in addition, another portion of the storage structure 510 may be arranged to provide an additional cache storage 515 that has its own associated additional cache control circuitry 530. This additional cache storage can be used to provide storage for one or more particular processing/requester elements within the system, and the associated cache control circuitry 530 can be arranged to apply standard allocation and eviction policies, aimed at improving performance of the requester element or requester elements that are allowed to use the additional cache storage 515.

In one example implementation, the system may provide a cluster of processing elements that are able to use the additional cache storage 515 as a level 3 cache for the cluster. For the other processing elements that are then allowed to access the final level cache 500, those processing elements are arranged to use the cache storage 520, and the usage of that cache is controlled so as to seek to reduce power consumption associated with accesses to memory.

As shown schematically in FIG. 6, the partition between the parts of the storage structure 510 used to implement the cache storage 520 and the parts of the storage structure used to implement the additional cache storage 515 can in some example implementations be dynamically adjusted. There are many ways in which such dynamic adjustment could be performed. For example, different ways of a set associative storage structure 510 could be allocated dynamically to either the cache storage 520 or the additional cache storage 515.

Figure 7:
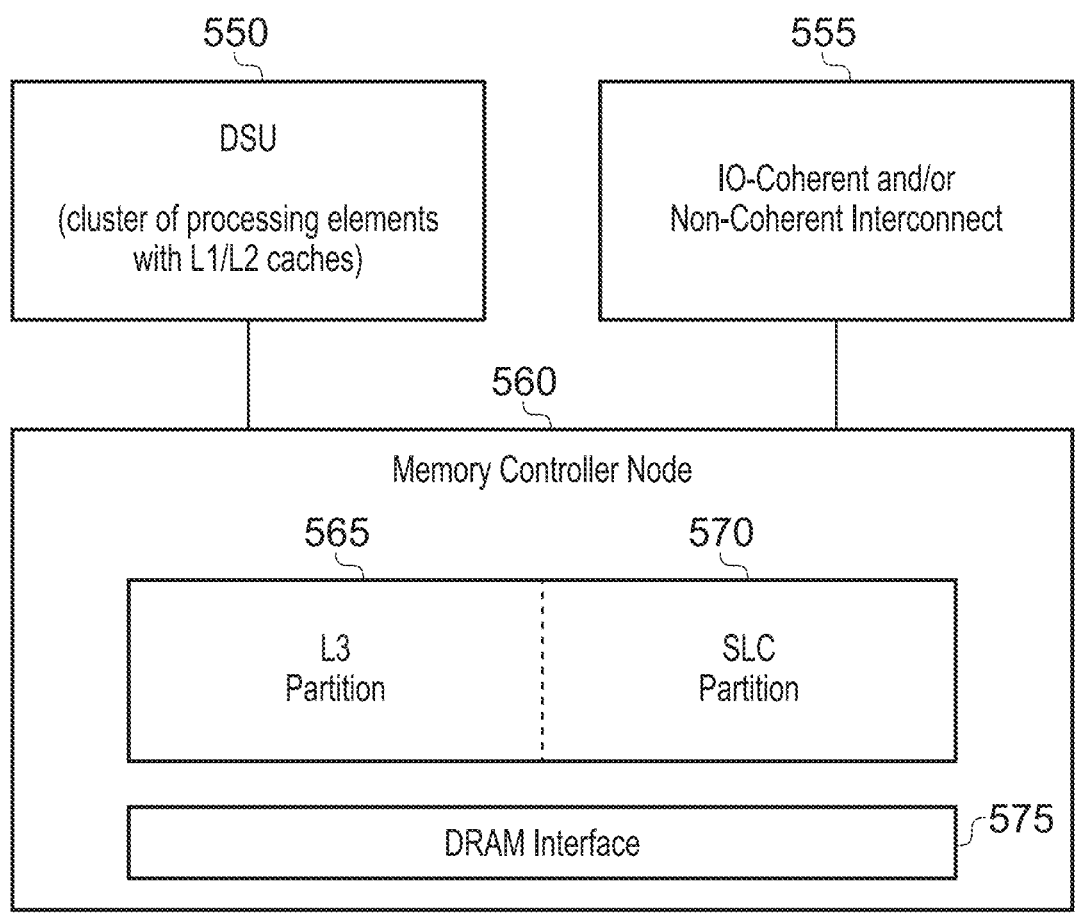
FIG. 7 is a block diagram illustrating a system in accordance with an alternative example implementation.

A system incorporating such a final level cache is shown schematically in FIG. 7. In this example, a DynamIQ Shared Unit (DSU) 550 is provided that integrates one or more processor cores to form a cluster. In addition, one or other processing elements may be provided that are coupled to an input/output (10) coherent interconnect and/or a non-coherent interconnect, shown collectively by the box 555. Both the DSU 550 and the interconnect block 555 are connected to a memory controller node 560 that includes a memory interface 575, in this example a DRAM interface, and a final level cache constructed as per FIG. 6. This final level cache will include a system level cache partition 570 and an L3 cache partition 565. The level 3 cache partition will be used by the DSU, and operate in accordance with standard allocation and eviction policies to seek to improve the performance of the processing elements within the DSU. In contrast, the SLC partition 570 will operate in accordance with the earlier-described allocation and eviction policies to seek to reduce power consumption associated with accesses to memory, and will be used by any processing elements that connect to the memory controller node 560 via the interconnect block 555.

Such an approach can provide a great deal of flexibility, by allowing a final level cache to be partitioned into two parts that operate in accordance with different allocation and eviction policies, so as to achieve a balance between providing performance benefits for certain processing elements, whilst reducing power consumption associated with memory accesses performed by other processing elements.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

It will be appreciated that the techniques described herein provide a novel use for one or more caches within a system. In particular, for such a cache, the allocation and eviction policies aim to determine what data to cache with the aim of reducing power consumption associated with accesses to memory, rather than concentrating on improving performance for one or more processing elements that may use the cache. In addition to enabling a significant reduction in power consumption to be achieved, such an approach also avoids the requirement to provide for dynamic reconfiguration of the cache resources by software, as the power consumption based allocation policy does not need to be changed in dependence on the tasks being undertaken by the processing elements that have access to the cache. The technique can be applied in association with any form of cache, and power savings can be achieved irrespective of the size of such a cache.

Other example arrangements are set out in the following clauses:

1. An apparatus comprising:
   a cache storage to cache data associated with memory addresses;
   a first interface to receive access requests, where each access request is a request to access data at a memory address indicated by that access request;
   a second interface to couple to a memory controller used to control access to memory; and
   cache control circuitry to control allocation of data into the cache storage in accordance with a power consumption based allocation policy that seeks to select which data is cached in the cache storage with the aim of conserving power associated with accesses to the memory via the second interface;
   wherein a given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage.

2. An apparatus as in Clause 1, wherein the cache control circuitry is arranged, on determining through application of the power consumption based allocation policy that the given data is not to be cached in the cache storage, to forward the given access request via the second interface to the memory controller to cause the given data to be accessed in the memory.

3. An apparatus as in Clause 1 or Clause 2, wherein the cache control circuitry is arranged to seek to cache the given data in the cache storage when, having regard to the one or more usage indications provided by the cache hint information, caching of the given data is anticipated to give rise to a saving in power consumption associated with accesses to the memory via the second interface.

4. An apparatus as in Clause 3, wherein one usage indication provided by the cache hint information is a "will be invalidated" indication, which, when set, indicates that the given data is of temporary validity, and the cache control circuitry is arranged to seek to cache the given data in the cache storage when the "will be invalidated" indication is set.

5. An apparatus as in Clause 3 or Clause 4, wherein one usage indication provided by the cache hint information is a multiple access indication, which, when set, indicates that multiple access requests to access the given data are anticipated to be received via the first interface, and the cache control circuitry is arranged to seek to cache the given data in the cache storage when the multiple access indication is set.

6. An apparatus as in any of clauses 3 to 5, wherein one usage indication provided by the cache hint information is a "multiple requests to same memory block" indication, which, when set, indicates that the given access request is one of multiple access requests to access data within a same memory block of the memory that are anticipated to be issued, and the cache control circuitry is arranged to seek to cache the given data in the cache storage when the "multiple requests to same memory block" indication is set.

7. An apparatus as in any of clauses 3 to 6, wherein one usage indication provided by the cache hint information is a do not cache indication, which, when set, indicates that the given data should not be cached.

8. An apparatus as in any of clauses 3 to 7, wherein the cache control circuitry is arranged, in the absence of any set usage indications, to assume that caching of the given data is not anticipated to give rise to a saving in power consumption associated with accesses to the memory via the second interface.

9. An apparatus as in any preceding clause, wherein the cache hint information is associated with the given access request by one of:
   a requester element arranged to generate the cache hint information for associating with the given access request when the given access request is issued by the requester element; and
   an intermediate element, located in a path between the requester element and the first interface, that is arranged to generate the cache hint information based on analysis of other information associated with the access request.

10. An apparatus as in any preceding clause, wherein the cache control circuitry is arranged, on determining that the given data should be cached in the cache storage but where no entry in the cache storage is currently available, to apply a power consumption based eviction policy in order to seek to select a victim entry within the cache whose currently cached data is to be evicted from the cache storage to make room for the given data, with the aim of conserving power associated with accesses to the memory via the second interface.

11. An apparatus as in Clause 10 wherein:
the cache storage comprises a plurality of entries and each entry has usage indication information associated therewith that is populated at the time data is allocated into that entry by the cache control circuitry; and
the cache control circuitry is arranged, when applying the power consumption based eviction policy, to seek to select the victim entry from one or more candidate entries for eviction, in dependence on the usage indication information associated with each of the one or more candidate entries for eviction.

12. An apparatus as in Clause 11, wherein the cache control circuitry is further arranged, when seeking to select the victim entry, to take into account the one or more usage indications provided by the cache hint information for the given data.

13. An apparatus as in Clause 12, wherein:
the cache control circuitry is arranged to associate priority levels with the entries of the cache storage based on their associated usage indication information, such that a first given entry has a higher priority level than a second given entry when, based on comparison of the usage indication information of the first given entry and the usage indication information of the second given entry, a greater power saving associated with accesses to the memory via the second interface is anticipated by retaining in the cache storage the data cached in the first given entry rather than the data cached in the second given entry;
the cache control circuitry is arranged, when applying the power consumption based eviction policy, to determine whether any of the one or more candidate entries for eviction are suitable to select as the victim entry, based on the priority levels associated with each candidate entry and the one or more usage indications provided by the cache hint information for the given data.

14. An apparatus as in Clause 13, wherein the cache control circuitry is arranged to associate the priority levels with the entries of the cache storage based on both their associated usage indication information, and an indication of whether the data currently cached in those entries has already been accessed since that data was cached in the cache storage.

15. An apparatus as in Clause 13 or Clause 14, wherein the cache control circuitry is arranged, on determining, having regard to the one or more usage indications provided by the cache hint information for the given data, that there is no entry with a priority level low enough to indicate that a power saving associated with accesses to the memory via the second interface is anticipated by evicting that entry's currently cached data to make space for the given data, to forward the given access request via the second interface to the memory controller to cause the given data to be accessed in the memory.

16. An apparatus as in any of clauses 11 to 15, wherein each entry is a cache line, and the usage indication information is provided for each cache line.

17. An apparatus as in any preceding clause, wherein:
the cache control circuitry is arranged, on occurrence of one or more events, to apply a cleaning policy to evict from one or more entries of the cache storage dirty data that is more up to date than a copy of that data stored in the memory; and
the cleaning policy is arranged to select the entries whose dirty data is to be evicted with the aim of conserving power associated with accesses to the memory via the second interface.

18. An apparatus as in Clause 17, wherein the cleaning policy is such that the cache control circuitry is arranged to select entries to evict in accordance with one or more of the following rules:
any entry having associated usage indication information set to indicate that the current cached data in that entry is of temporary validity will be inhibited from being selected for eviction unless all entries in the cache storage have their associated usage indication information set to indicate that the current cached data in those entries is of temporary validity;
when multiple entries that are targeting a same memory block in the memory have dirty data cached therein, the cache control circuitry is arranged to evict the cached data in those multiple entries together in order to allow the memory controller to update the data from those multiple evicted entries whilst the same memory block is accessed;
in the absence of there being multiple entries that are targeting the same memory block in the memory, the cache control circuitry is arranged to select a sequence of entries for eviction whose cached data is associated with different banks within the memory.

19. An apparatus as in any preceding clause, wherein the apparatus is arranged to be incorporated within a system comprising a hierarchical arrangement of caches, and the cache storage forms a final level cache in the hierarchical arrangement of caches.

20. An apparatus as in any preceding clause, further comprising:
a storage structure configured to provide both the cache storage and an additional cache storage; and
additional cache control circuitry to control allocation of data into the additional cache storage in accordance with an alternative allocation policy that is different to the power consumption based allocation policy.

21. An apparatus as in Clause 20, wherein:
the first interface is arranged to receive access requests from multiple sources, one source being a cluster of processing elements;
the first interface is arranged to direct access requests received from the cluster of processing elements to the additional cache control circuitry, and to direct access requests received from at least one other source to the cache control circuitry; and
the alternative allocation policy is such as to cause the additional cache storage to be used to cache data with the aim of improving performance of access to that data by the processing elements of the cluster.

22. An apparatus as in Clause 21, wherein the storage structure is configurable to allow an amount of the storage structure used to provide the cache storage and an amount of the storage structure used to provide the additional cache storage to be dynamically adjusted.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a cache storage to cache data associated with memory addresses;
a first interface to receive access requests, where each access request is a request to access data at a memory address indicated by that access request;
a second interface to couple to a memory controller used to control access to memory; and
cache control circuitry to control allocation of data into the cache storage in accordance with a power consumption based allocation policy that seeks to select which data is cached in the cache storage with the aim of conserving power associated with accesses to the memory via the second interface;
wherein a given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage;
wherein the cache control circuitry is arranged to seek to cache the given data in the cache storage when, having regard to the one or more usage indications provided by the cache hint information, caching of the given data is anticipated to give rise to a saving in power consumption associated with accesses to the memory via the second interface;
wherein one usage indication provided by the cache hint information is a "will be invalidated" indication, which, when set, indicates that the given data is of temporary validity, and the cache control circuitry is arranged to seek to cache the given data in the cache storage when the "will be invalidated" indication is set.

2. An apparatus as claimed in claim 1, wherein the cache control circuitry is arranged, on determining through application of the power consumption based allocation policy that the given data is not to be cached in the cache storage, to forward the given access request via the second interface to the memory controller to cause the given data to be accessed in the memory.

3. An apparatus as claimed in claim 1, wherein one usage indication provided by the cache hint information is a multiple access indication, which, when set, indicates that multiple access requests to access the given data are anticipated to be received via the first interface, and the cache control circuitry is arranged to seek to cache the given data in the cache storage when the multiple access indication is set.

4. An apparatus as claimed in claim 1, wherein one usage indication provided by the cache hint information is a do not cache indication, which, when set, indicates that the given data should not be cached.

5. An apparatus as claimed in claim 1, wherein the cache control circuitry is arranged, in the absence of any set usage indications, to assume that caching of the given data is not anticipated to give rise to a saving in power consumption associated with accesses to the memory via the second interface.

6. An apparatus as claimed in claim 1, wherein the cache hint information is associated with the given access request by one of:
a requester element arranged to generate the cache hint information for associating with the given access request when the given access request is issued by the requester element; and
an intermediate element, located in a path between the requester element and the first interface, that is arranged to generate the cache hint information based on analysis of other information associated with the access request.

7. An apparatus as claimed in claim 1, wherein the cache control circuitry is arranged, on determining that the given data should be cached in the cache storage but where no entry in the cache storage is currently available, to apply a power consumption based eviction policy in order to seek to select a victim entry within the cache whose currently cached data is to be evicted from the cache storage to make room for the given data, with the aim of conserving power associated with accesses to the memory via the second interface.

8. An apparatus as claimed in claim 7 wherein:
the cache storage comprises a plurality of entries and each entry has usage indication information associated therewith that is populated at the time data is allocated into that entry by the cache control circuitry; and
the cache control circuitry is arranged, when applying the power consumption based eviction policy, to seek to select the victim entry from one or more candidate entries for eviction, in dependence on the usage indication information associated with each of the one or more candidate entries for eviction.

9. An apparatus as claimed in claim 8, wherein the cache control circuitry is further arranged, when seeking to select the victim entry, to take into account the one or more usage indications provided by the cache hint information for the given data.

10. An apparatus as claimed in claim 8, wherein each entry is a cache line, and the usage indication information is provided for each cache line.

11. An apparatus as claimed in claim 1, wherein:
the cache control circuitry is arranged, on occurrence of one or more events, to apply a cleaning policy to evict from one or more entries of the cache storage dirty data that is more up to date than a copy of that data stored in the memory; and the cleaning policy is arranged to select the entries whose dirty data is to be evicted with the aim of conserving power associated with accesses to the memory via the second interface.

12. An apparatus as claimed in claim 11, wherein the cleaning policy is such that the cache control circuitry is arranged to select entries to evict in accordance with one or more of the following rules:

any entry having associated usage indication information set to indicate that the current cached data in that entry is of temporary validity will be inhibited from being selected for eviction unless all entries in the cache storage have their associated usage indication information set to indicate that the current cached data in those entries is of temporary validity;

when multiple entries that are targeting a same memory block in the memory have dirty data cached therein, the cache control circuitry is arranged to evict the cached data in those multiple entries together in order to allow the memory controller to update the data from those multiple evicted entries whilst the same memory block is accessed;

in the absence of there being multiple entries that are targeting the same memory block in the memory, the cache control circuitry is arranged to select a sequence of entries for eviction whose cached data is associated with different banks within the memory.

13. An apparatus as claimed in claim 1, wherein the apparatus is arranged to be incorporated within a system comprising a hierarchical arrangement of caches, and the cache storage forms a final level cache in the hierarchical arrangement of caches.

14. An apparatus as claimed in claim 1, further comprising:

a storage structure configured to provide both the cache storage and an additional cache storage; and additional cache control circuitry to control allocation of data into the additional cache storage in accordance with an alternative allocation policy that is different to the power consumption based allocation policy.

15. An apparatus as claimed in claim 14, wherein:

the first interface is arranged to receive access requests from multiple sources, one source being a cluster of processing elements;

the first interface is arranged to direct access requests received from the cluster of processing elements to the additional cache control circuitry, and to direct access requests received from at least one other source to the cache control circuitry; and the alternative allocation policy is such as to cause the additional cache storage to be used to cache data with the aim of improving performance of access to that data by the processing elements of the cluster.

16. An apparatus as claimed in claim 15, wherein the storage structure is configurable to allow an amount of the storage structure used to provide the cache storage and an amount of the storage structure used to provide the additional cache storage to be dynamically adjusted.

17. A non-transitory computer-readable medium to store computer-readable code for fabrication of the apparatus of claim 1.

18. An apparatus comprising:

a cache storage to cache data associated with memory addresses;

a first interface to receive access requests, where each access request is a request to access data at a memory address indicated by that access request;

a second interface to couple to a memory controller used to control access to memory; and cache control circuitry to control allocation of data into the cache storage in accordance with a power consumption based allocation policy that seeks to select which data is cached in the cache storage with the aim of conserving power associated with accesses to the memory via the second interface;

wherein a given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage;

wherein the cache control circuitry is arranged to seek to cache the given data in the cache storage when, having regard to the one or more usage indications provided by the cache hint information, caching of the given data is anticipated to give rise to a saving in power consumption associated with accesses to the memory via the second interface;

wherein one usage indication provided by the cache hint information is a "multiple requests to same memory block" indication, which, when set, indicates that the given access request is one of multiple access requests to access data within a same memory block of the memory that are anticipated to be issued, and the cache control circuitry is arranged to seek to cache the given data in the cache storage when the "multiple requests to same memory block" indication is set.

19. An apparatus comprising:

a cache storage to cache data associated with memory addresses;

a first interface to receive access requests, where each access request is a request to access data at a memory address indicated by that access request;

a second interface to couple to a memory controller used to control access to memory; and cache control circuitry to control allocation of data into the cache storage in accordance with a power consumption based allocation policy that seeks to select which data is cached in the cache storage with the aim of conserving power associated with accesses to the memory via the second interface;

wherein a given access request considered by the cache control circuitry is provided with associated cache hint information providing one or more usage indications for given data at the memory address indicated by that given access request, and the cache control circuitry is arranged to reference the associated cache hint information when applying the power consumption based allocation policy to determine whether to cache the given data in the cache storage;

wherein the cache control circuitry is arranged, on determining that the given data should be cached in the cache storage but where no entry in the cache storage is currently available, to apply a power consumption based eviction policy in order to seek to select a victim entry within the cache whose currently cached data is to be evicted from the cache storage to make room for the given data, with the aim of conserving power associated with accesses to the memory via the second interface;

wherein:

the cache storage comprises a plurality of entries and each entry has usage indication information associated therewith that is populated at the time data is allocated into that entry by the cache control circuitry; and the cache control circuitry is arranged, when applying the power consumption based eviction policy, to seek to select the victim entry from one or more candidate entries for eviction, in dependence on the usage indication information associated with each of the one or more candidate entries for eviction;

wherein the cache control circuitry is further arranged, when seeking to select the victim entry, to take into account the one or more usage indications provided by the cache hint information for the given data, wherein:

the cache control circuitry is arranged to associate priority levels with the entries of the cache storage based on their associated usage indication information, such that a first given entry has a higher priority level than a second given entry when, based on comparison of the usage indication information of the first given entry and the usage indication information of the second given entry, a greater power saving associated with accesses to the memory via the second interface is anticipated by retaining in the cache storage the data cached in the first given entry rather than the data cached in the second given entry;

the cache control circuitry is arranged, when applying the power consumption based eviction policy, to determine whether any of the one or more candidate entries for eviction are suitable to select as the victim entry, based on the priority levels associated with each candidate entry and the one or more usage indications provided by the cache hint information for the given data.

20. An apparatus as claimed in claim 19, wherein the cache control circuitry is arranged to associate the priority levels with the entries of the cache storage based on both their associated usage indication information, and an indication of whether the data currently cached in those entries has already been accessed since that data was cached in the cache storage.

21. An apparatus as claimed in claim 19, wherein the cache control circuitry is arranged, on determining, having regard to the one or more usage indications provided by the cache hint information for the given data, that there is no entry with a priority level low enough to indicate that a power saving associated with accesses to the memory via the second interface is anticipated by evicting that entry's currently cached data to make space for the given data, to forward the given access request via the second interface to the memory controller to cause the given data to be accessed in the memory.

22. A method of operating a cache storage to cache data associated with memory addresses, comprising:

receiving at a first interface access requests, where each access request is a request to access data at a memory address indicated by that access request;

coupling a second interface to a memory controller used to control access to memory; and controlling allocation of data into the cache storage in accordance with a power consumption based allocation policy that seeks to select which data is cached in the cache storage with the aim of conserving power associated with accesses to the memory via the second interface;

wherein a given access request is provided with associated cache hint information providing one or more usage indications for given data at the memory address indicated by that given access request, and the associated cache hint information is referenced when applying the power consumption based allocation policy to determine whether to cache the given data in the cache storage;

wherein the power consumption based allocation policy seeks to cache the given data in the cache storage when, having regard to the one or more usage indications provided by the cache hint information, caching of the given data is anticipated to give rise to a saving in power consumption associated with accesses to the memory via the second interface;

wherein one usage indication provided by the cache hint information is a "will be invalidated" indication, which, when set, indicates that the given data is of temporary validity, and the method comprises seeking to cache the given data in the cache storage when the "will be invalidated" indication is set.

* * * * *